United States Patent
Esteves et al.

(10) Patent No.: US 8,526,342 B2
(45) Date of Patent: Sep. 3, 2013

(54) METHODS AND APPARATUS FOR ADAPTIVE RESOURCE MULTIPLEXING IN A PEER-TO-PEER NETWORK

(75) Inventors: Eduardo S. Esteves, San Diego, CA (US); Junyi Li, Chester, NJ (US); Saurabh Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 13/092,791

(22) Filed: Apr. 22, 2011

(65) Prior Publication Data

US 2012/0269115 A1    Oct. 25, 2012

(51) Int. Cl.
*H04B 7/00* (2006.01)
(52) U.S. Cl.
USPC .......................................................... 370/310
(58) Field of Classification Search
USPC ................. 370/310, 315, 328, 329, 431, 464, 370/465, 474; 709/220, 223, 226–229
See application file for complete search history.

(56) References Cited

U.S. PATENT DOCUMENTS

| | | | |
|---|---|---|---|
| 6,269,099 B1 | 7/2001 | Borella et al. | |
| 8,189,508 B2 * | 5/2012 | Park et al. | 370/328 |
| 2006/0120302 A1 | 6/2006 | Poncini et al. | |
| 2007/0211678 A1 | 9/2007 | Li et al. | |
| 2008/0069063 A1 | 3/2008 | Li et al. | |
| 2008/0130483 A1 | 6/2008 | Khandekar et al. | |
| 2010/0189046 A1 * | 7/2010 | Baker et al. | 370/329 |
| 2010/0260093 A1 * | 10/2010 | Liu et al. | 370/315 |
| 2011/0066738 A1 * | 3/2011 | Richardson et al. | 709/229 |
| 2011/0087768 A1 | 4/2011 | Wu et al. | |

OTHER PUBLICATIONS

International Search Report and Written Opinion—PCT/US2012/034583—ISA/EPO—Jul. 16, 2012.

* cited by examiner

*Primary Examiner* — Dmitry H Levitan
(74) *Attorney, Agent, or Firm* — James K. O'Hare

(57) ABSTRACT

A method of wireless communication includes determining resources available for peer discovery. The resources include first peer discovery resources with a first time interval and second peer discovery resources with a second time interval less than the first time interval. The method further includes communicating peer discovery signals through a first subset of peer discovery resources of the first peer discovery resources and a second subset of peer discovery resources of the second peer discovery resources. The second subset of peer discovery resources includes less resource elements than the first subset of peer discovery resources.

36 Claims, 11 Drawing Sheets

|  | D1 | D2 |
|---|---|---|
| Number of PDRIDs | 896 | 896 |
| $N_T$ | 28 | 28 |
| $N_S$ | 32 | 32 |
| $N_B$ | 5 | 4 |
| K | 16 | 14 |
| Constellation | QPSK | 8-PSK |
| Number of Info Bits | 70 | 70 |
| Number of Code Bits | 136 | 126 |

METHODS AND APPARATUS FOR ADAPTIVE RESOURCE MULTIPLEXING IN A PEER-TO-PEER NETWORK

BACKGROUND

1. Field

The present disclosure relates generally to communication systems, and more particularly, to adaptive resource multiplexing in a peer-to-peer network.

2. Background

In a wireless wide area network (WWAN), all communication between wireless devices and a serving base station are through the uplink/downlink channels between the wireless devices and the serving base station. If two communicating wireless devices are in the vicinity of each other, the two wireless devices can communicate directly without going through the base station. Such direct peer-to-peer communication can enable new types of services and/or reduce the traffic load on the base station.

To enable peer-to-peer communication, wireless devices in the vicinity of each other may periodically participate in peer discovery by transmitting peer discovery signals. Methods for enabling peer discovery in WWAN systems are needed.

SUMMARY

In an aspect of the disclosure, a method of wireless communication includes determining resources available for peer discovery. The resources include first peer discovery resources with a first time interval and second peer discovery resources with a second time interval less than the first time interval. The method further includes communicating peer discovery signals through a first subset of peer discovery resources of the first peer discovery resources and a second subset of peer discovery resources of the second peer discovery resources. The second subset of peer discovery resources includes less resource elements than the first subset of peer discovery resources.

In an aspect of the disclosure, an apparatus for wireless communication includes means for determining resources available for peer discovery. The resources include first peer discovery resources with a first time interval and second peer discovery resources with a second time interval less than the first time interval. The apparatus further includes means for communicating peer discovery signals through a first subset of peer discovery resources of the first peer discovery resources and a second subset of peer discovery resources of the second peer discovery resources. The second subset of peer discovery resources includes less resource elements than the first subset of peer discovery resources.

In an aspect of the disclosure, a computer program product includes a computer-readable medium. The computer-readable medium includes code for determining resources available for peer discovery. The resources include first peer discovery resources with a first time interval and second peer discovery resources with a second time interval less than the first time interval. The computer-readable medium further includes code for communicating peer discovery signals through a first subset of peer discovery resources of the first peer discovery resources and a second subset of peer discovery resources of the second peer discovery resources. The second subset of peer discovery resources includes less resource elements than the first subset of peer discovery resources.

In an aspect of the disclosure, an apparatus for wireless communication includes a processing system. The processing system is configured to determine resources available for peer discovery. The resources include first peer discovery resources with a first time interval and second peer discovery resources with a second time interval less than the first time interval. The processing system is further configured to communicate peer discovery signals through a first subset of peer discovery resources of the first peer discovery resources and a second subset of peer discovery resources of the second peer discovery resources. The second subset of peer discovery resources includes less resource elements than the first subset of peer discovery resources.

BRIEF DESCRIPTION OF THE DRAWINGS

FIG. 9 is a diagram for illustrating an exemplary method.

DETAILED DESCRIPTION

Figure 1:
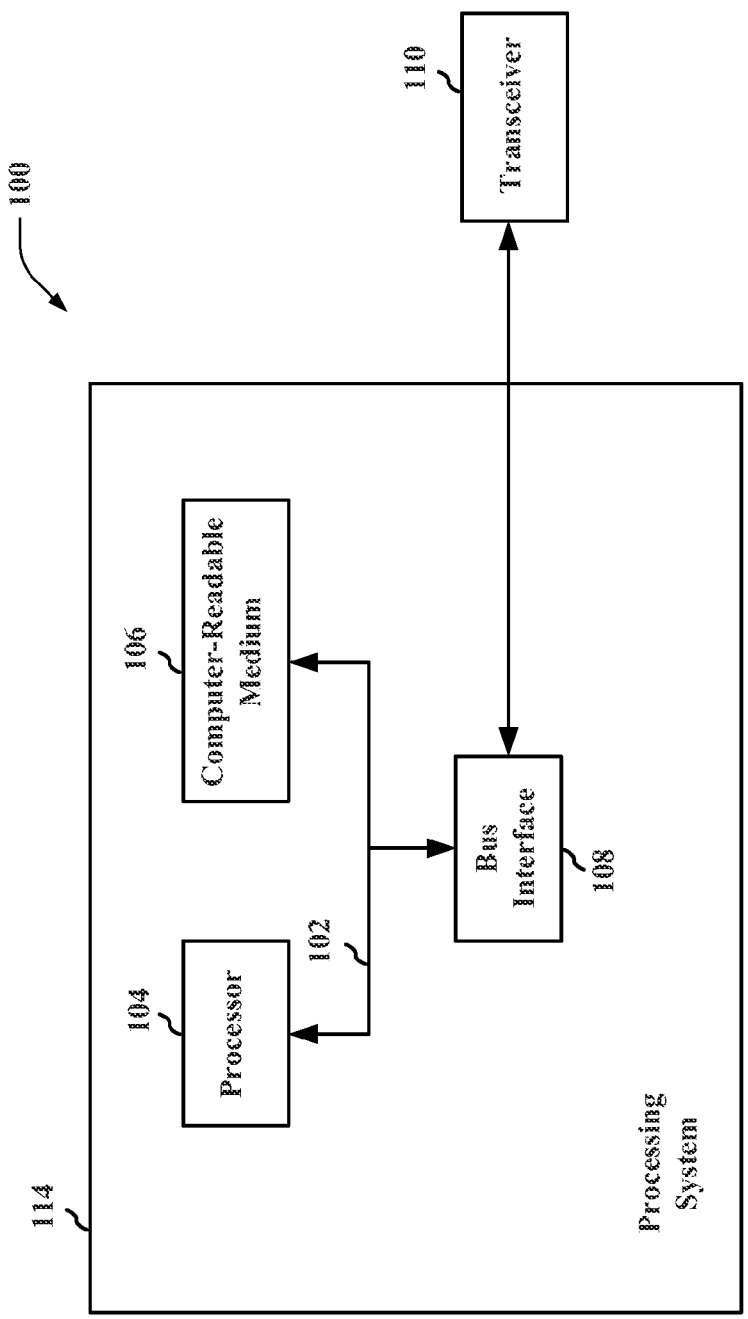
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
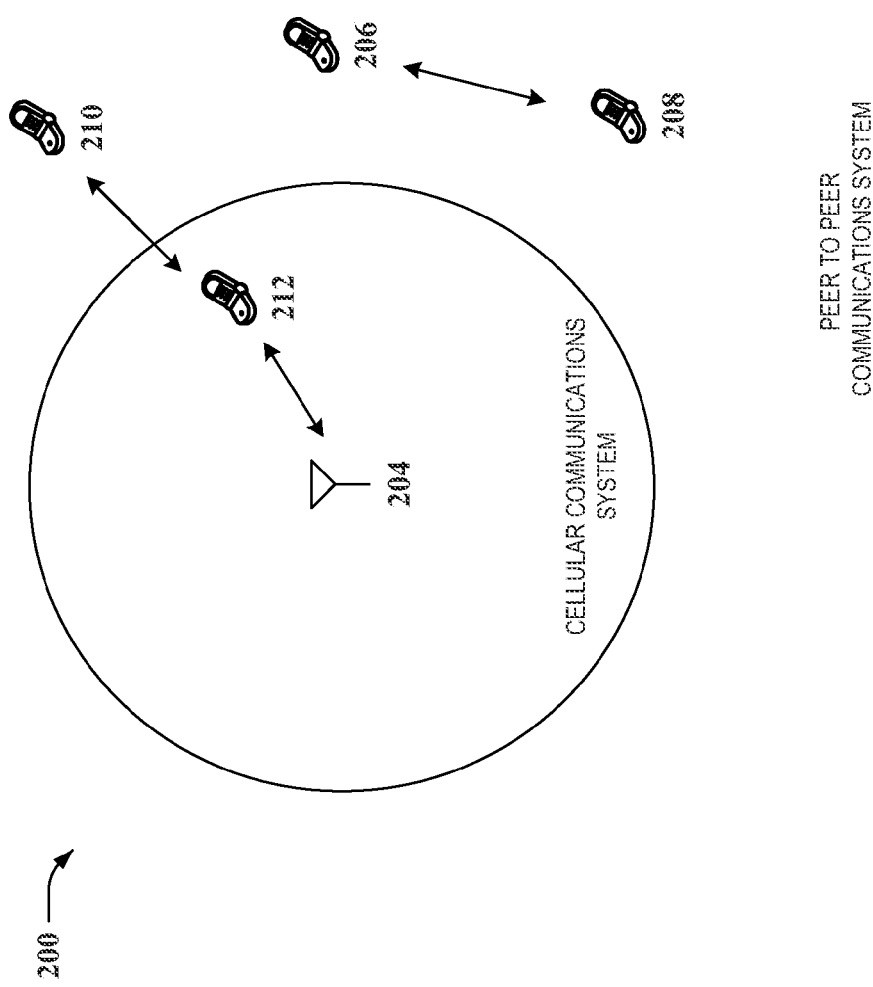
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a WWAN. Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
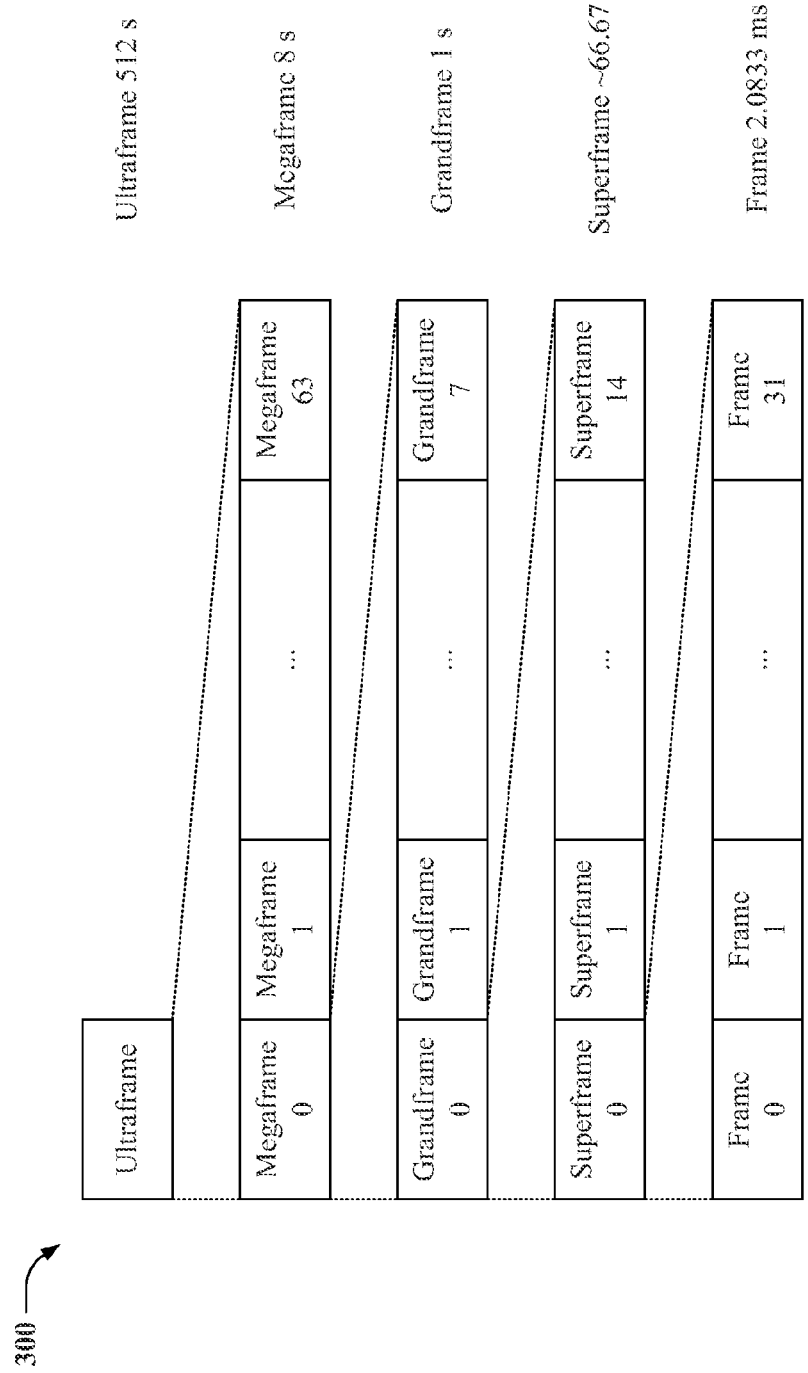
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
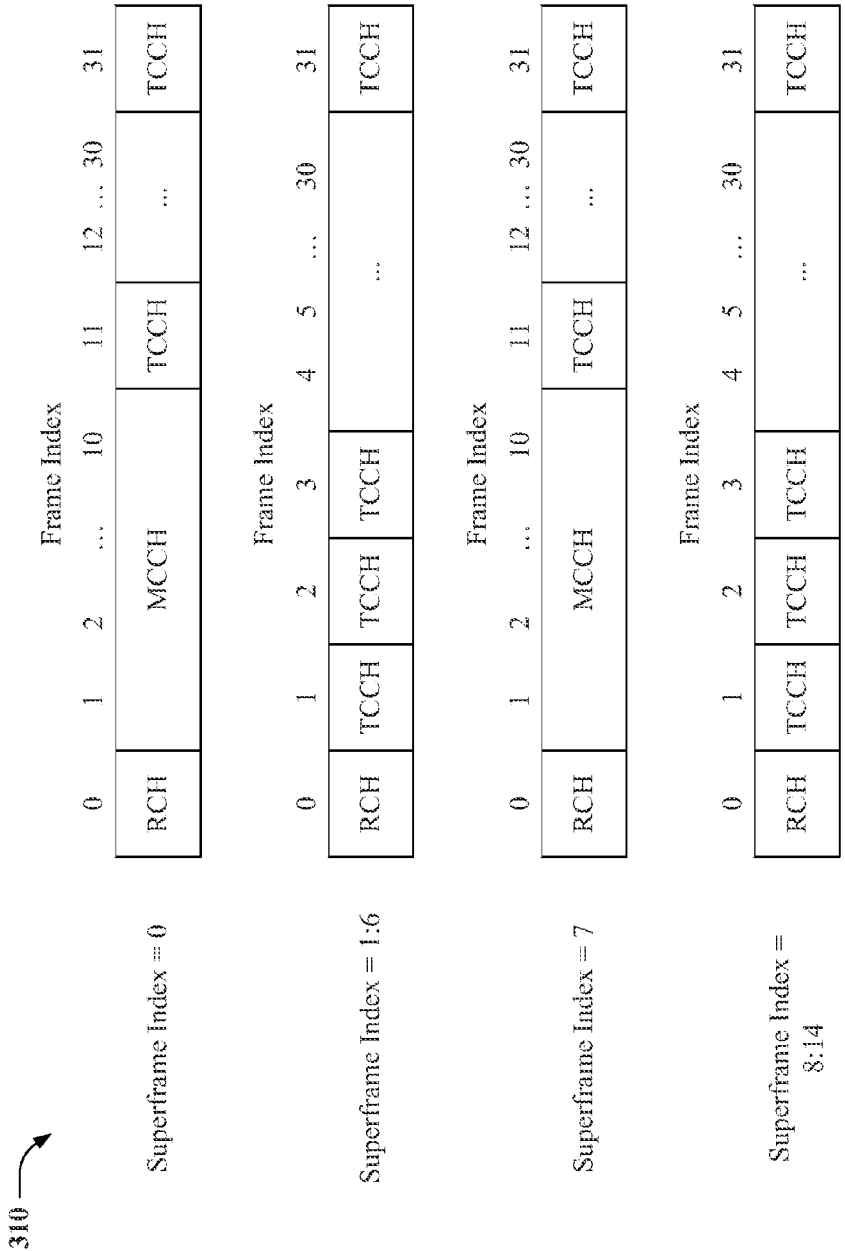
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an 8$^{th}$ superframe (with index 7), frame 0 is a RCH, frames 1-10 are each a MCCH, and frames 11-31 are each a TCCH. In the 9$^{th}$ through 15$^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
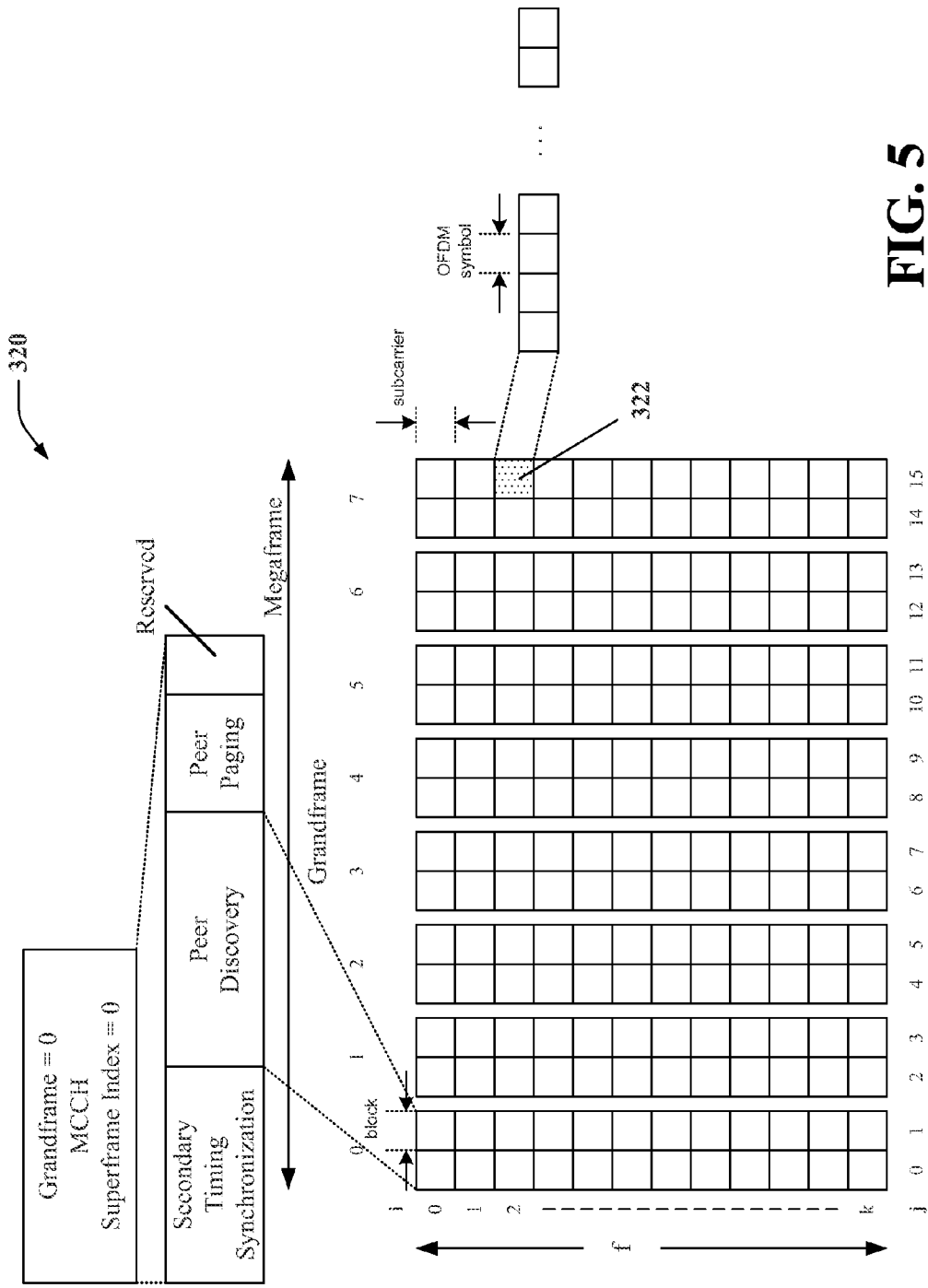
FIG. 5 is a diagram illustrating an operation timeline of a miscellaneous channel and a structure of a peer discovery channel.

FIG. 5 is a diagram 320 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency divisional multiplexing (OFDM) symbols at the same subcarrier (e.g., 72 resource elements). FIG. 5 provides an example of a subchannel (e.g., short range peer discovery channel) including blocks in one megaframe, which includes the MCCH superframe index 0 of grandframes 0 through 7. One megaframe may be considered one peer discovery burst. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 322 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices. The peer discovery signals may include unique expressions that allow users to determine to which wireless devices to form a peer-to-peer communication link.

Figure 6:
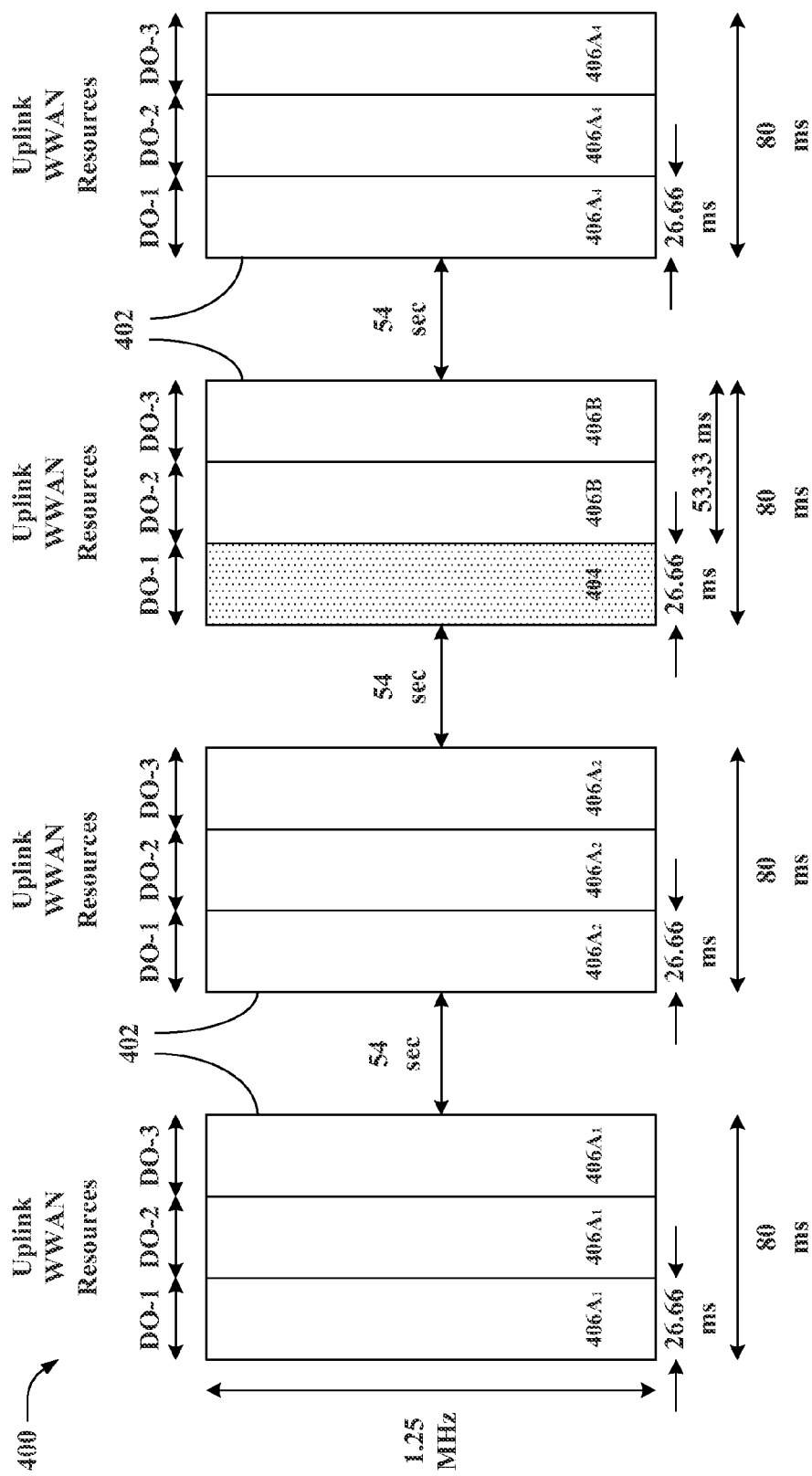
FIG. 6 is a diagram illustrating exemplary uplink WWAN resources.

FIG. 6 is a diagram 400 illustrating exemplary uplink WWAN resources. FIG. 6 illustrates uplink WWAN resources for an evolution data optimized/only (EV-DO) system, and particularly an EV-DO silence interval within a CDMA2000 system, but the exemplary methods are applicable to other systems as well, such as systems with predefined silent periods on either uplink or downlink and time division multiple access (TDMA) based systems such as Global System for Mobile Communications (GSM), Long Term Evolution (LTE) Time Division Duplex (TDD), Personal Handy-phone System (PHS), Personal Digital Cellular (PDC), Digital Enhanced Cordless Telecommunications (DECT), and IS-54/IS-136 (known as Digital AMPS (D-AMPS)). For example, the exemplary methods may be utilized in particular time slots in GMS or LTE TDD systems. EV-DO (previously known as 1xEV-DO) is a telecommunications standard for the wireless transmission of data through radio signals. EV-DO is part of the CDMA2000 family of standards. EV-DO uses multiplexing techniques such as CDMA and time division multiple access (TDMA) to maximize both individual users' throughput and the overall system throughput. An EV-DO channel has a bandwidth of 1.25 MHz. In an EV-DO system, every 54 seconds there is an 80 ms silence interval in which the EV-DO devices are required to stop transmitting in the uplink to allow the base station to measure the power of the background interference and noise. The periodic (or repetitive) 80 ms silence interval 402 includes three consecutive frames, each of which is approximately 26.66 ms (i.e., 80/3 ms). In an exemplary method, the base station allocates the silence interval 402 for peer discovery, and therefore allows wireless devices to utilize the silence interval 402 for peer discovery. In order to avoid causing interference to WWAN communication within a WWAN, wireless devices may utilize the silence interval 402 for peer discovery rather than a set of resources allocated every second in each grandframe as discussed in FIG. 5.

In one configuration, the base station utilizes at least one frame of a silence interval of a plurality of silence intervals to measure background interference and noise. For example, the base station may utilize one frame 404 of one silence interval of every four silence intervals. As such, the EV-DO silence interval 402 may include a first subset of resources 404 and a second subset of resources 406A$_1$, 406A$_2$, 406A$_4$ (herein referred to as 406A) and 406B. The first subset of resources 404 are utilized by the serving base station to measure noise and the second subset of resources 406A, 406B are unutilized by the base station to measure noise and are allocated to wireless devices for peer discovery. As such, wireless devices that use the allocated EV-DO silence interval resources for peer discovery utilize the resources 406A with an 80 ms time interval and the resources 406B with approximately a 53.33 ms time interval.

Referring back to FIG. 5, one peer discovery burst may be considered to include one macro block, which includes all of the peer discovery resources in the megaframe and allocates one peer discovery transmission per wireless device. In contrast, in an exemplary adaptive method for utilizing the two sets of resources with different time intervals, a differing number of macro blocks with different characteristics are utilized in each of the two sets of resources based on the time interval. The adaptive method includes a first method for utilizing the resources 406A with an 80 ms time interval and a second method for utilizing the resources 408A with a 53.33 ms time interval. The two methods work in a time division multiplexing (TDM) manner, allow for reuse of many hardware modules, and allow the same number of total resources to be mapped to a different number of EV-DO bursts using different constellations (i.e., digital modulation scheme) and a code puncturing.

Figure 7:
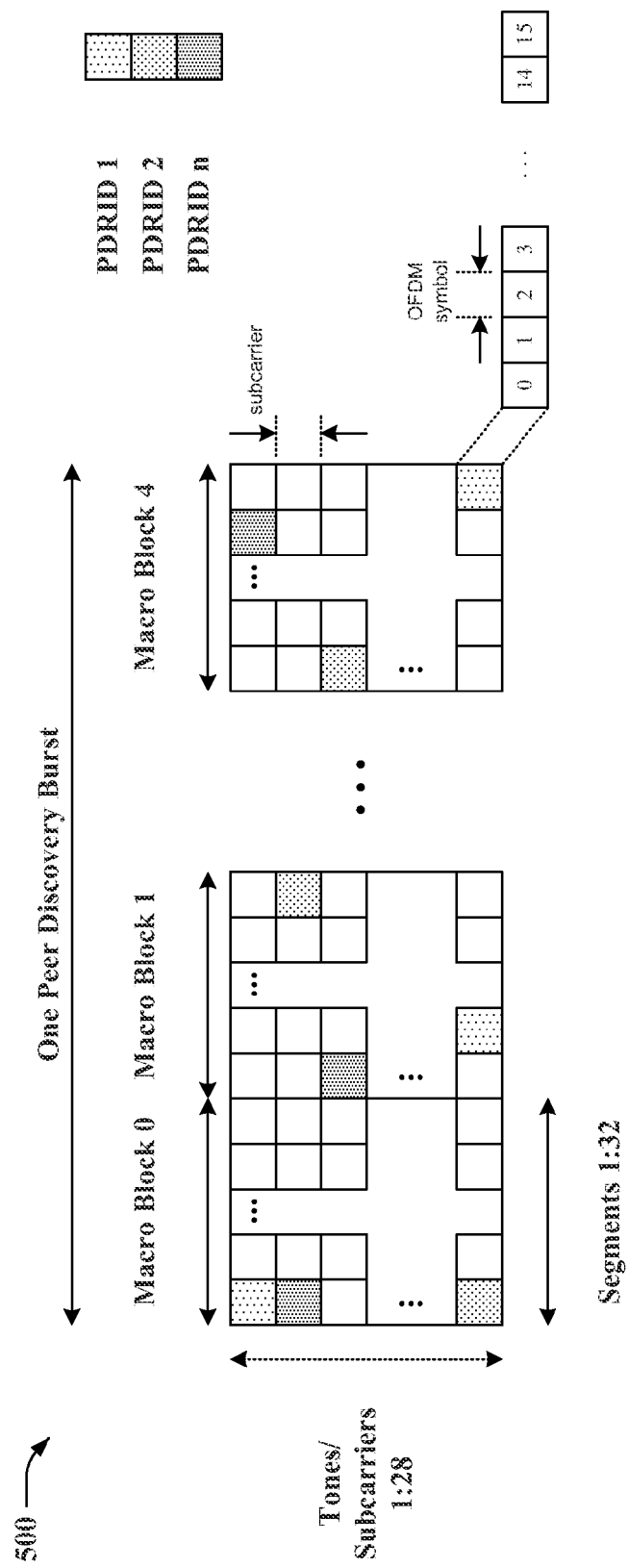
FIG. 7 is a diagram illustrating an exemplary structure of the peer discovery channel.

FIG. 7 is a diagram 500 illustrating an exemplary structure of a peer discovery channel. As shown in FIG. 7, for the 80 ms time interval, one peer discovery burst may be split into five macro blocks, macro block 0 through macro block 4, each of which includes 28 tones/subcarriers and 32 segments. Wireless devices are each associated with one PDRID and are each allotted one block (i.e., a particular segment at a particular subcarrier) in each of the macro blocks for transmitting a peer discovery signal and therefore the resources support 896 (28*32) PDRIDs. As such, with five macro blocks, wireless devices are allotted five blocks in each peer discovery burst. Each block includes 16 OFDM symbols at a particular subcarrier. In such a configuration, 70 information bits may be encoded with a ½ rate convolutional code to obtain 140 coded bits. The 140 coded bits may be punctured to reduce to 136 punctured coded bits. The 136 punctured coded bits may be mapped to 80 resource elements (16 OFDM symbols at a particular subcarrier*5 macro blocks) using a quadrature phase-shift keying (QPSK) constellation.

Figure 8:
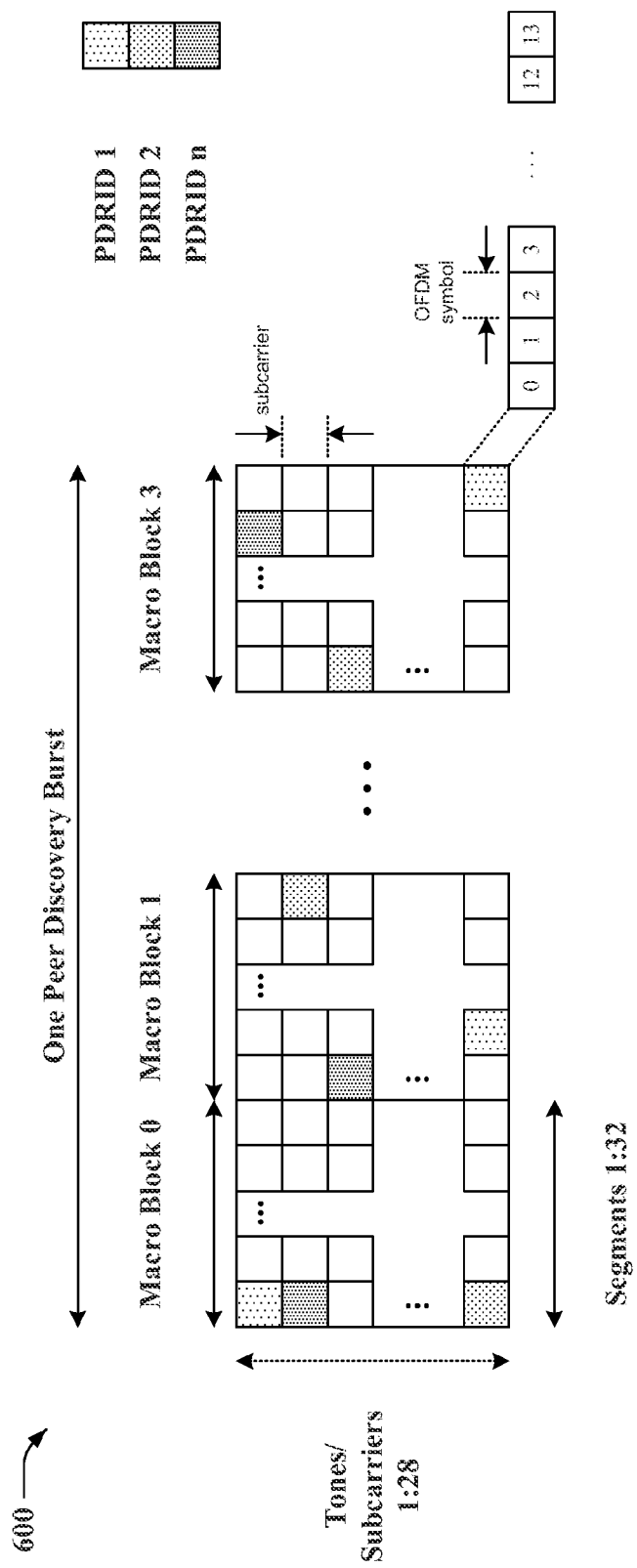
FIG. 8 is another diagram illustrating an exemplary structure of the peer discovery channel.

FIG. 8 is a diagram 600 illustrating an exemplary structure of a peer discovery channel. As shown in FIG. 8, for the 53.33 ms time interval, one peer discovery burst may be split into four macro blocks, macro block 0 through macro block 3, each of which includes 28 tones/subcarriers and 32 segments. Wireless devices are each associated with one PDRID and are each allotted one block in each of the macro blocks for transmitting a peer discovery signal and therefore the resources support 896 PDRIDs. As such, with four macro blocks, wireless devices are allotted four blocks in each peer discovery burst. Each block includes 14 OFDM symbols at a particular subcarrier. In such a configuration, 70 information bits may be encoded with a ½ rate convolutional code to obtain 140 coded bits. The 140 coded bits may be punctured to reduce to 126 punctured coded bits. The 126 punctured coded bits may be mapped to the 56 resource elements (14 OFDM symbols at a particular subcarrier*4 macro blocks) using an 8 phase shift keying (8-PSK) constellation.

FIG. 9 is a diagram 700 for illustrating an exemplary method. The peer discovery channel structures discussed in relation to FIG. 7 and FIG. 8 are exemplary only, as other design architectures are possible. Generally, the resource design architecture may be characterized by a number of tones/subcarriers $N_T$, a number of segments $N_S$, a number of blocks $N_B$, and a number of resource elements K in each of the blocks. For the 80 ms interval (design D1), $N_S$ may be 32, $N_T$ may be 28, $N_B$ may be 5, and K may be 16. For the 53.33 ms interval (design D2), $N_S$ may be 32, $N_T$ may be 28, $N_B$ may be 4, and K may be 14. Other configurations of $N_S$, $N_T$, $N_B$, and K are possible. Furthermore, the values for $N_S$, $N_T$, $N_B$, and K may change based on the length of the particular available time intervals and/or size of the available resources. Assuming the above selection of the parameters for $N_S$, $N_T$, $N_B$, and K for design D1, 70 information bits may be encoded to 140 coded bits, 4 of these bits may be punctured, and the 136 punctured coded bits may be mapped to the 80 resource elements using a QPSK constellation. Assuming the above selection of the parameters for $N_S$, $N_T$, $N_B$, and K for design D2, 70 information bits may be encoded to 140 coded bits, 14 of these bits may be punctured, and the 126 punctured coded bits may be mapped to the 56 resource elements using an 8-PSK constellation. The 56 resource elements of design D2 are approximately ⅔ of the resources (i.e., 80 resource elements) of design D1. Using the parameters for design D1 and design D2, the convolutional code used remains unchanged, and therefore additional hardware is not necessarily needed. In addition, the number of PDRIDs remains the same. Furthermore, because $N_T$ is the same for design D1 and design D2, a fast Fourier transform (FFT)/inverse FFT (IFFT) module can be reused. However, as discussed supra, the exemplary methods are not limited to any particular selection of parameters.

Figure 10:
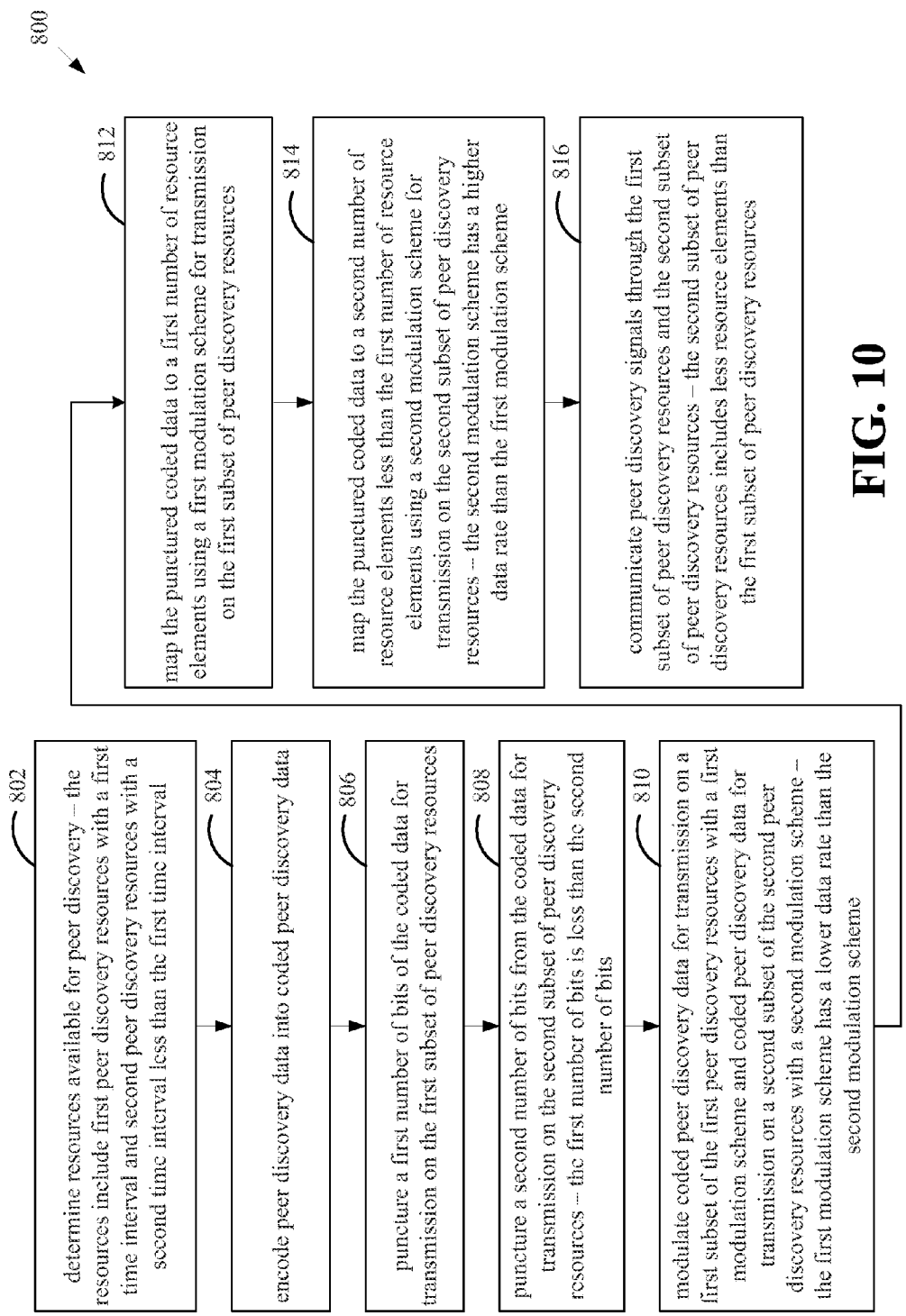
FIG. 10 is a flow chart of a method of wireless communication.

FIG. 10 is a flow chart 800 of a method of wireless communication. The method is performed by a wireless device. As shown in FIG. 10, a wireless device determines resources available for peer discovery (802). The resources include first peer discovery resources with a first time interval and second peer discovery resources with a second time interval less than the first time interval (802). For example, the resources may include the first peer discovery resources 406A with an 80 ms time interval and second peer discovery resources 406B with approximately a 53.33 ms time interval. In one configuration, the first peer discovery resources include resources associated with a number of PDRIDs and the second peer discovery resources include resources associated with the same number of PDRIDs. For example, the first peer discovery resources may include $N_{B1}$ macro blocks, $N_{T1}$ tones/subcarriers, and $N_{S1}$ segments. Assuming each PDRID is associated with one block in each of the $N_{B1}$ macro blocks, the first peer discovery resources may include resources associated with $N_{T1}*N_{S1}$ PDRIDs. In addition, the second peer discovery resources may include $N_{B2}$ macro blocks, $N_{T2}$ tones/subcarriers, and $N_{S2}$ segments. Assuming each PDRID is associated with one block in each of the $N_{B2}$ macro blocks, the second peer discovery resources may include resources associated with $N_{T2}*N_{S2}$ PDRIDs. In the configuration, $N_{T1}*N_{S1}=N_{T2}*N_{S2}$.

The wireless device encodes peer discovery data into coded peer discovery data (804), punctures a first number of bits of the coded data for transmission on the first subset of peer discovery resources (806), and punctures a second number of bits from the coded data for transmission on the second subset of peer discovery resources (808). The first number of bits is less than the second number of bits (808). For example, the wireless device may encode 70 data bits into 140 coded peer discovery data bits. If the wireless device utilizes the first subset of peer discovery resources, the wireless device may puncture 4 bits of data, and if the wireless device utilizes the second subset of peer discovery resources, the wireless device may puncture 14 bits of data.

The wireless device modulates the coded peer discovery data for transmission on a first subset of the first peer discovery resources with a first modulation scheme and the coded peer discovery data for transmission on a second subset of the second peer discovery resources with a second modulation scheme (810). The first modulation scheme has a lower data rate than the second modulation scheme (810). For example, the wireless device may modulate 136 bits of punctured coded data for transmission on a first subset of resources of the resources $406A_1$ with the QPSK modulation scheme. The first subset of resources includes the blocks associated with the PDRID of the wireless device in each of the $N_B$ macro blocks (see FIG. 7) in the resources $406A_1$. In addition, the wireless device may modulate 126 bits of punctured coded data for transmission on a second subset of resources of the resources 406B with the 8-PSK modulation scheme, which has a higher data rate than the QPSK modulation scheme. The second subset of resources includes the blocks associated with the PDRID of the wireless device in each of the $N_B$ macro blocks (see FIG. 8) in the resources 406B. The wireless device maps the punctured coded data to a first number of resource elements using a first modulation scheme for transmission on the first subset of peer discovery resources (812). The wireless device maps the punctured coded data to a second number of resource elements less than the first number of resource elements using a second modulation scheme for transmission on the second subset of peer discovery resources (814). The second modulation scheme has a higher data rate than the first modulation scheme. For example, the wireless device may map 136 bits of punctured coded data using QPSK for transmission on 80 resource elements within the resources 406A1 and may map 126 bits of punctured coded data using 8-PSK for transmission on 56 resource elements within the resources 406B.

The wireless device communicates peer discovery signals through the first subset of peer discovery resources and the second subset of peer discovery resources (816). The second subset of peer discovery resources includes less resource elements than the first subset of peer discovery resources (816). For example, the wireless device may communicate peer discovery signals through a first subset of the resources 406A1 and a second subset of the resources 406B. As shown in FIG. 7, the first subset of peer discovery resources may contain 16 resource elements in each of the five macro blocks. As shown in FIG. 8, the second subset of peer discovery resources may contain 14 resource elements in each of the four macro blocks. The first and second subsets of peer discovery resources may be associated with one PDRID of the PDRIDs. As discussed supra, data in the second subset of peer discovery resources may be communicated at a higher data rate than data in the first subset of peer discovery resources. In addition, the first peer discovery resources (e.g., 406A) and the second peer discovery resources (e.g., 406B) may each include a plurality of macro blocks with each of the macro blocks including the same number of subcarriers and the same number of blocks. In such a configuration, the first peer discovery resources 406A may include more macro blocks than the second peer discovery resources 406B. Each of the blocks in the macro blocks of the first peer discovery resources may include more resource elements than each of the blocks in the macro blocks of the second peer discovery resources.

Figure 11:
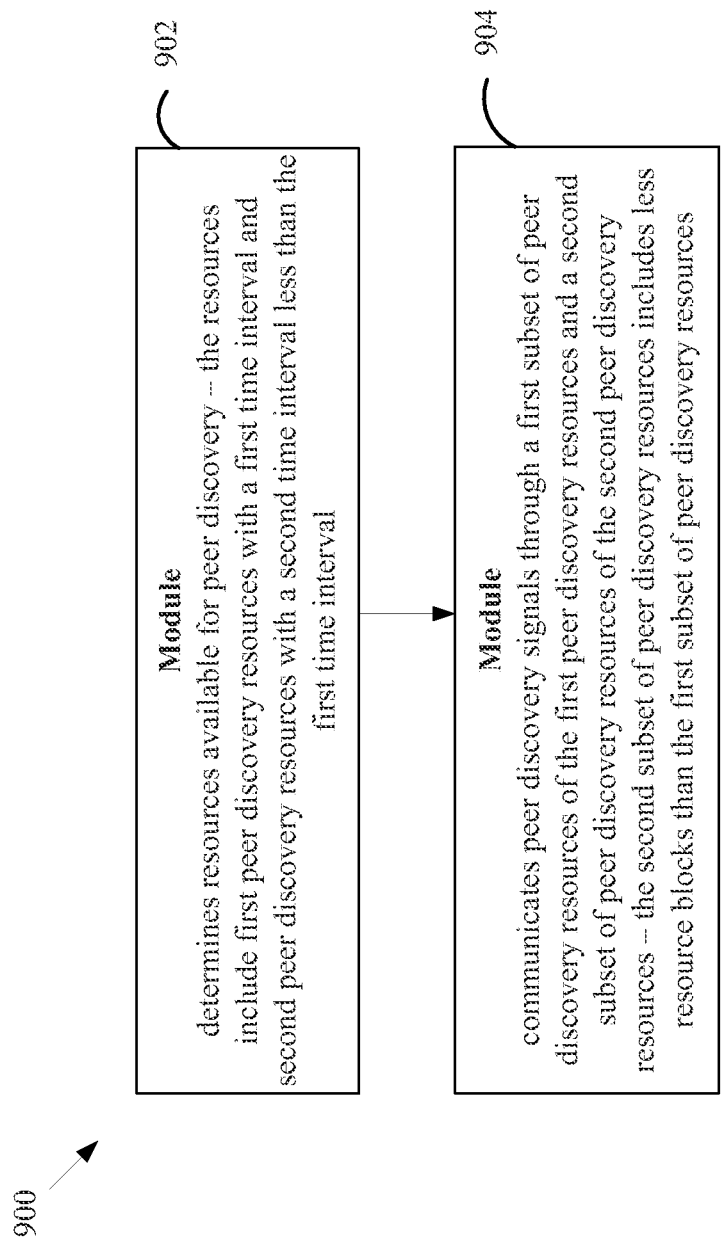
FIG. 11 is a conceptual block diagram illustrating the functionality of an exemplary apparatus.

FIG. 11 is a conceptual block diagram 900 illustrating the functionality of an exemplary apparatus. The apparatus is a wireless device. The wireless device includes a module 902 that determines resources available for peer discovery. The resources include first peer discovery resources with a first time interval and second peer discovery resources with a second time interval less than the first time interval. In addition, the wireless device includes a module 904 that communicates peer discovery signals through a first subset of peer discovery resources of the first peer discovery resources and a second subset of peer discovery resources of the second peer discovery resources. The second subset of peer discovery resources includes less resource elements than the first subset of peer discovery resources. The apparatus 100 may include additional modules that perform each of the steps in the aforementioned flow charts. As such, each step in the aforementioned flow charts may be performed by a module and the apparatus 100 may include one or more of those modules.

Referring to FIG. 1, in one configuration, the apparatus 100 for wireless communication is a wireless device and includes means for determining resources available for peer discovery. The resources include first peer discovery resources with a first time interval and second peer discovery resources with a second time interval less than the first time interval. The apparatus 100 further includes means for communicating peer discovery signals through a first subset of peer discovery resources of the first peer discovery resources and a second subset of peer discovery resources of the second peer discovery resources. The second subset of peer discovery resources includes less resource elements than the first subset of peer discovery resources. The apparatus 100 may further include means for modulating coded peer discovery data for transmission on the first subset of peer discovery resources with a first modulation scheme and coded peer discovery data for transmission on the second subset of peer discovery resources with a second modulation scheme. The first modulation scheme has a lower data rate than the second modulation scheme. The apparatus 100 may further include means for encoding peer discovery data into coded peer discovery data, means for puncturing a first number of bits of the coded data for transmission on the first subset of peer discovery resources, and means for puncturing a second number of bits from the coded data for transmission on the second subset of peer discovery resources. The first number of bits is less than the second number of bits. The apparatus 100 may further include means for mapping the punctured coded data to a first number of resource elements using a first modulation scheme for transmission on the first subset of peer discovery resources, and means for mapping the punctured coded data to a second number of resource elements less than the first number of resource elements a second modulation scheme for transmission on the second subset of peer discovery resources. The second modulation scheme has a higher data rate than the first modulation scheme. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   determining resources available for peer discovery during a measurement silence interval of a base station, the resources comprising first peer discovery resources with a first time interval and second peer discovery resources with a second time interval less than the first time interval; and
   communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources.

2. The method of claim 1, wherein the first peer discovery resources comprise resources associated with a number of peer discovery resource identifiers (PDRIDs) and the second peer discovery resources comprise resources associated with the same number of PDRIDs, the first subset of peer discovery resources and the second subset of peer discovery resources being associated with one PDRID of the PDRIDs.

3. The method of claim 1, wherein data in the second subset of peer discovery resources are communicated at a higher data rate than data in the first subset of peer discovery resources.

4. A method of wireless communication, comprising:
determining resources available for peer discovery, the resources comprising first peer discovery resources with a first time interval and second peer discovery resources with a second time interval less than the first time interval;
communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources, wherein data in the second subset of peer discovery resources are communicated at a higher data rate than data in the first subset of peer discovery resources; and
modulating coded peer discovery data for transmission on the first subset of peer discovery resources with a first modulation scheme and coded peer discovery data for transmission on the second subset of peer discovery resources with a second modulation scheme, the first modulation scheme having a lower data rate than the second modulation scheme.

5. A method of wireless communication, comprising:
determining resources available for peer discovery, the resources comprising first peer discovery resources with a first time interval and second peer discovery resources with a second time interval less than the first time interval;
communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources;
encoding peer discovery data into coded peer discovery data;
puncturing a first number of bits of the coded data for transmission on the first subset of peer discovery resources; and
puncturing a second number of bits from the coded data for transmission on the second subset of peer discovery resources,
wherein the first number of bits is less than the second number of bits.

6. The method of claim 5, further comprising:
mapping the punctured coded data to a first number of resource elements using a first modulation scheme for transmission on the first subset of peer discovery resources; and
mapping the punctured coded data to a second number of resource elements less than the first number of resource elements a second modulation scheme for transmission on the second subset of peer discovery resources, the second modulation scheme having a higher data rate than the first modulation scheme.

7. A method of wireless communication, comprising:
determining resources available for peer discovery, the resources comprising first peer discovery resources with a first time interval and second peer discovery resources with a second time interval less than the first time interval;
communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources,
wherein the first peer discovery resources and the second peer discovery resources comprise a plurality of macro blocks, each of the macro blocks comprising the same number of subcarriers and the same number of blocks.

8. The method of claim 7, wherein the first peer discovery resources comprise more macro blocks than the second peer discovery resources.

9. The method of claim 7, wherein each of the blocks in the macro blocks of the first peer discovery resources comprise more resource elements than each of the blocks in the macro blocks of the second peer discovery resources.

10. An apparatus for wireless communication, comprising:
means for determining resources available for peer discovery during a measurement silence interval of a base station, the resources comprising first peer discovery resources with a first time interval and second peer discovery resources with a second time interval less than the first time interval; and
means for communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources.

11. The apparatus of claim 10, wherein the first peer discovery resources comprise resources associated with a number of peer discovery resource identifiers (PDRIDs) and the second peer discovery resources comprise resources associated with the same number of PDRIDs, the first subset of peer discovery resources and the second subset of peer discovery resources being associated with one PDRID of the PDRIDs.

12. The apparatus of claim 10, wherein data in the second subset of peer discovery resources are communicated at a higher data rate than data in the first subset of peer discovery resources.

13. An apparatus for wireless communication, comprising:
means for determining resources available for peer discovery, the resources comprising first peer discovery resources with a first time interval and second peer discovery resources with a second time interval less than the first time interval;
means for communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources, wherein data in the second subset of peer discovery resources are communicated at a higher data rate than data in the first subset of peer discovery resources; and
means for modulating coded peer discovery data for transmission on the first subset of peer discovery resources with a first modulation scheme and coded peer discovery data for transmission on the second subset of peer discovery resources with a second modulation scheme, the first modulation scheme having a lower data rate than the second modulation scheme.

14. An apparatus for wireless communication, comprising:
means for determining resources available for peer discovery, the resources comprising first peer discovery resources with a first time interval and second peer discovery resources with a second time interval less than the first time interval;

means for communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources;

means for encoding peer discovery data into coded peer discovery data;

means for puncturing a first number of bits of the coded data for transmission on the first subset of peer discovery resources; and means for puncturing a second number of bits from the coded data for transmission on the second subset of peer discovery resources, wherein the first number of bits is less than the second number of bits.

15. The apparatus of claim 14, further comprising:

means for mapping the punctured coded data to a first number of resource elements using a first modulation scheme for transmission on the first subset of peer discovery resources; and means for mapping the punctured coded data to a second number of resource elements less than the first number of resource elements a second modulation scheme for transmission on the second subset of peer discovery resources, the second modulation scheme having a higher data rate than the first modulation scheme.

16. An apparatus for wireless communication, comprising:

means for determining resources available for peer discovery, the resources comprising first peer discovery resources with a first time interval and second peer discovery resources with a second time interval less than the first time interval;

means for communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources, wherein the first peer discovery resources and the second peer discovery resources comprise a plurality of macro blocks, each of the macro blocks comprising the same number of subcarriers and the same number of blocks.

17. The apparatus of claim 16, wherein the first peer discovery resources comprise more macro blocks than the second peer discovery resources.

18. The apparatus of claim 16, wherein each of the blocks in the macro blocks of the first peer discovery resources comprise more resource elements than each of the blocks in the macro blocks of the second peer discovery resources.

19. A computer program product, comprising:

a non-transitory computer-readable medium comprising code for:

determining resources available for peer discovery during a measurement silence interval of a base station, the resources comprising first peer discovery resources with a first time interval and second peer discovery resources with a second time interval less than the first time interval; and communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources.

20. The computer program product of claim 19, wherein the first peer discovery resources comprise resources associated with a number of peer discovery resource identifiers (PDRIDs) and the second peer discovery resources comprise resources associated with the same number of PDRIDs, the first subset of peer discovery resources and the second subset of peer discovery resources being associated with one PDRID of the PDRIDs.

21. The computer program product of claim 19, wherein data in the second subset of peer discovery resources are communicated at a higher data rate than data in the first subset of peer discovery resources.

22. A computer program product, comprising:

a non-transitory computer-readable medium comprising code for:

determining resources available for peer discovery during a measurement silence interval of a base station, the resources comprising first peer discovery resources with a first time interval and second peer discovery resources with a second time interval less than the first time interval;

communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources, wherein data in the second subset of peer discovery resources are communicated at a higher data rate than data in the first subset of peer discovery resources; and modulating coded peer discovery data for transmission on the first subset of peer discovery resources with a first modulation scheme and coded peer discovery data for transmission on the second subset of peer discovery resources with a second modulation scheme, the first modulation scheme having a lower data rate than the second modulation scheme.

23. A computer program product, comprising:

a non-transitory computer-readable medium comprising code for:

determining resources available for peer discovery during a measurement silence interval of a base station, the resources comprising first peer discovery resources with a first time interval and second peer discovery resources with a second time interval less than the first time interval;

communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources;

encoding peer discovery data into coded peer discovery data;

puncturing a first number of bits of the coded data for transmission on the first subset of peer discovery resources; and puncturing a second number of bits from the coded data for transmission on the second subset of peer discovery resources, wherein the first number of bits is less than the second number of bits.

24. The computer program product of claim 23, wherein the computer-readable medium further comprises code for:
mapping the punctured coded data to a first number of resource elements using a first modulation scheme for transmission on the first subset of peer discovery resources; and
mapping the punctured coded data to a second number of resource elements less than the first number of resource elements a second modulation scheme for transmission on the second subset of peer discovery resources, the second modulation scheme having a higher data rate than the first modulation scheme.

25. A computer program product, comprising:
a non-transitory computer-readable medium comprising code for:
determining resources available for peer discovery during a measurement silence interval of a base station, the resources comprising first peer discovery resources with a first time interval and second peer discovery resources with a second time interval less than the first time interval;
communicating peer discovery signals through a first subset of peer discovery resources of the first peer discovery resources and a second subset of peer discovery resources of the second peer discovery resources, the second subset of peer discovery resources comprising less resource elements than the first subset of peer discovery resources,
wherein the first peer discovery resources and the second peer discovery resources comprise a plurality of macro blocks, each of the macro blocks comprising the same number of subcarriers and the same number of blocks.

26. The computer program product of claim 25, wherein the first peer discovery resources comprise more macro blocks than the second peer discovery resources.

27. The computer program product of claim 25, wherein each of the blocks in the macro blocks of the first peer discovery resources comprise more resource elements than each of the blocks in the macro blocks of the second peer discovery resources.

28. An apparatus for wireless communication, comprising:
a transceiver coupled to a processing system configured to:
determine resources available for peer discovery during a measurement silence interval of a base station, the resources comprising first peer discovery resources with a first time interval and second peer discovery resources with a second time interval less than the first time interval; and
communicate peer discovery signals through a first subset of peer discovery resources of the first peer discovery resources and a second subset of peer discovery resources of the second peer discovery resources, the second subset of peer discovery resources comprising less resource elements than the first subset of peer discovery resources.

29. The apparatus of claim 28, wherein the first peer discovery resources comprise resources associated with a number of peer discovery resource identifiers (PDRIDs) and the second peer discovery resources comprise resources associated with the same number of PDRIDs, the first subset of peer discovery resources and the second subset of peer discovery resources being associated with one PDRID of the PDRIDs.

30. The apparatus of claim 28, wherein data in the second subset of peer discovery resources are communicated at a higher data rate than data in the first subset of peer discovery resources.

31. An apparatus for wireless communication, comprising:
a transceiver coupled to a processing system configured to:
determine resources available for peer discovery during a measurement silence interval of a base station, the resources comprising first peer discovery resources with a first time interval and second peer discovery resources with a second time interval less than the first time interval;
communicate peer discovery signals through a first subset of peer discovery resources of the first peer discovery resources and a second subset of peer discovery resources of the second peer discovery resources, the second subset of peer discovery resources comprising less resource elements than the first subset of peer discovery resources, wherein data in the second subset of peer discovery resources are communicated at a higher data rate than data in the first subset of peer discovery resources; and
modulate coded peer discovery data for transmission on the first subset of peer discovery resources with a first modulation scheme and coded peer discovery data for transmission on the second subset of peer discovery resources with a second modulation scheme, the first modulation scheme having a lower data rate than the second modulation scheme.

32. An apparatus for wireless communication, comprising:
a transceiver coupled to a processing system configured to:
determine resources available for peer discovery during a measurement silence interval of a base station, the resources comprising first peer discovery resources with a first time interval and second peer discovery resources with a second time interval less than the first time interval;
communicate peer discovery signals through a first subset of peer discovery resources of the first peer discovery resources and a second subset of peer discovery resources of the second peer discovery resources, the second subset of peer discovery resources comprising less resource elements than the first subset of peer discovery resources;
encode peer discovery data into coded peer discovery data;
puncture a first number of bits of the coded data for transmission on the first subset of peer discovery resources; and
puncture a second number of bits from the coded data for transmission on the second subset of peer discovery resources,
wherein the first number of bits is less than the second number of bits.

33. The apparatus of claim 32, wherein the processing system is further configured to:
map the punctured coded data to a first number of resource elements using a first modulation scheme for transmission on the first subset of peer discovery resources; and
map the punctured coded data to a second number of resource elements less than the first number of resource elements a second modulation scheme for transmission on the second subset of peer discovery resources, the second modulation scheme having a higher data rate than the first modulation scheme.

34. An apparatus for wireless communication, comprising:
a transceiver coupled to a processing system configured to:

determine resources available for peer discovery during a measurement silence interval of a base station, the resources comprising first peer discovery resources with a first time interval and second peer discovery resources with a second time interval less than the first time interval; and communicate peer discovery signals through a first subset of peer discovery resources of the first peer discovery resources and a second subset of peer discovery resources of the second peer discovery resources, the second subset of peer discovery resources comprising less resource elements than the first subset of peer discovery resources;

wherein the first peer discovery resources and the second peer discovery resources comprise a plurality of macro blocks, each of the macro blocks comprising the same number of subcarriers and the same number of blocks.

35. The apparatus of claim 34, wherein the first peer discovery resources comprise more macro blocks than the second peer discovery resources.

36. The apparatus of claim 34, wherein each of the blocks in the macro blocks of the first peer discovery resources comprise more resource elements than each of the blocks in the macro blocks of the second peer discovery resources.

* * * * *